(12) United States Patent
Eaton et al.

(10) Patent No.: US 8,121,968 B2
(45) Date of Patent: Feb. 21, 2012

(54) LONG-TERM MEMORY IN A VIDEO ANALYSIS SYSTEM

(75) Inventors: John Eric Eaton, Houston, TX (US); Wesley Kenneth Cobb, The Woodlands, TX (US); Ming-Jung Seow, Houston, TX (US); David Samuel Friedlander, Houston, TX (US); Gang Xu, Houston, TX (US)

(73) Assignee: Behavioral Recognition Systems, Inc., Houston, TX (US)

( * ) Notice: Subject to any disclaimer, the term of this patent is extended or adjusted under 35 U.S.C. 154(b) by 832 days.

(21) Appl. No.: 12/208,551

(22) Filed: Sep. 11, 2008

(65) Prior Publication Data

US 2010/0063949 A1 Mar. 11, 2010

(51) Int. Cl.
*G06F 17/00* (2006.01)
*G06F 15/18* (2006.01)
*G06N 5/02* (2006.01)
*G06K 9/62* (2006.01)
*G06K 9/46* (2006.01)
*G06K 9/66* (2006.01)

(52) U.S. Cl. ............ 706/46; 706/12; 382/155; 382/192; 382/227

(58) Field of Classification Search .................. None
See application file for complete search history.

(56) References Cited

U.S. PATENT DOCUMENTS

| | | | |
|---|---|---|---|
| 6,909,745 B1 | 6/2005 | Puri et al. | |
| 6,985,890 B2 * | 1/2006 | Inokuchi | 706/46 |
| 7,068,842 B2 | 6/2006 | Liang et al. | |
| 2003/0206717 A1 | 11/2003 | Yogeshwar et al. | |
| 2004/0268380 A1 | 12/2004 | Divakaran et al. | |
| 2007/0179760 A1 * | 8/2007 | Smith | 703/2 |
| 2008/0193010 A1 | 8/2008 | Eaton et al. | |
| 2008/0247599 A1 | 10/2008 | Porikli et al. | |
| 2009/0324107 A1 * | 12/2009 | Walch | 382/224 |
| 2010/0061624 A1 | 3/2010 | Cobb et al. | |

FOREIGN PATENT DOCUMENTS

| | | |
|---|---|---|
| JP | 2007272768 | 10/2007 |
| KR | 1020080018642 A | 2/2008 |

OTHER PUBLICATIONS

Bradski, Gary et al.; "STORE working memory networks for storage and recall of arbitrary temporal sequences"; 1994; Biological Cybernetics 71; pp. 469-480.*
S. Apewokin, et al. "Multimodal Mean Adaptive Backgrounding for Embedded Real-Time Video Surveillance," (2007) IEEE 6 pages.

(Continued)

*Primary Examiner* — Jeffrey A Gaffin
*Assistant Examiner* — Stanley K Hill
(74) *Attorney, Agent, or Firm* — Patterson & Sheridan LLP

(57) ABSTRACT

A long-term memory used to store and retrieve information learned while a video analysis system observes a stream of video frames is disclosed. The long-term memory provides a memory with a capacity that grows in size gracefully, as events are observed over time. Additionally, the long-term memory may encode events, represented by sub-graphs of a neural network. Further, rather than predefining a number of patterns recognized and manipulated by the long-term memory, embodiments of the invention provide a long-term memory where the size of a feature dimension (used to determine the similarity between different observed events) may grow dynamically as necessary, depending on the actual events observed in a sequence of video frames.

24 Claims, 12 Drawing Sheets

OTHER PUBLICATIONS

Chris Stauffer, et al. "Adaptive Background Mixture Models for Real-Time Tracking," The Artificial Intelligence Laboratory, Massachussetts Institute of Technology 7 pages.

Ahmed Elgammal, et al. "Non-parametric Model for Background Substraction," Computer Vision Laboratory, University of Maryland 17 pages.

Ismail Haritaoglu, et al. "W4: Real-Time Surveillance of People and Their Activities," IEEE Transactions on Pattern Analysis and Machine Intelligence, vol. 22, No. 8 (Aug. 2000), pp. 809-830.

Yuri Ivanov, et al. "Video Surveillance of Interactions," MIT Media Laboratory, Cambridge, MA 8 pages.

Chris Stauffer, et al. "Learning Patterns of Activity Using Real-Time Tracking," Artificial Intelligence Laboratory, Massachussetts Institute of Technology, Cambridge, MA 17 pages.

Pentti Kanerva, "Sparse Distributed Memory and Related Models," M.H. Hassoun, ed., Associative Neural Memories: Theory and Implementation, pp. 50-76. New York: Oxford University Press (1993).

Andrew Senior, et al. "Appearance Models for Occlusion Handling," IBM T.J. Watson Research Center, Yorktown, Heights, NY, 8 pages.

PCT International Search Report for PCT/US2009/056561, dated Mar. 25, 2010.

Search Report and Written Opinion for Serial No. PCT/US2009/068308 dated Jul. 21, 2010.

\* cited by examiner

LONG-TERM MEMORY IN A VIDEO ANALYSIS SYSTEM

CROSS REFERENCE TO RELATED APPLICATION

This application relates to commonly assigned co-pending, U.S. patent application Ser. No. 12/028,484 filed Feb. 8, 2008, entitled "Behavioral Recognition System", which is herein incorporated by reference in their entirety.

BACKGROUND OF THE INVENTION

1. Field of the Invention

Embodiments of the invention provide a long-term memory used to store and retrieve percepts in a video analysis system. More specifically, embodiments of the invention relate to techniques for programmatically associating, learning, and recalling patterns of behavior depicted in a sequence of video frames.

2. Description of the Related Art

Some currently available video surveillance systems are provide simple object recognition capabilities. For example, a video surveillance system may be configured to classify a group of pixels in a given frame having certain specified characteristics (referred to as a "blob") as being a particular object (e.g., a person or vehicle). Once identified, a "blob" may be tracked from frame-to-frame in order to follow the movement of the "blob" over time, e.g., a person walking across the field of vision of a video surveillance camera. Further, such systems may be able to determine when an object has engaged in certain predefined behaviors.

However, such surveillance systems typically require that the objects and/or behaviors which may be recognized by the system to be defined in advance. Thus, in practice, these systems simply compare recorded video to predefined definitions for objects and/or behaviors. In other words, unless the underlying system includes a description of a particular object or behavior, the system is generally incapable of recognizing that behavior (or at least instances of the pattern describing the particular object or behavior). Thus, to recognize additional objects or behaviors, separate software products may need to be developed. This results in surveillance systems with recognition capabilities that are labor intensive and prohibitively costly to maintain or adapt for different specialized applications. For example, monitoring airport entrances for lurking criminals and identifying swimmers who are not moving in a pool are two distinct situations, and therefore may require developing two distinct software products having their respective "abnormal" behaviors pre-coded. Thus, currently available video surveillance systems are typically incapable of recognizing new patterns of behavior that may emerge in a given scene or recognizing changes in existing patterns. Further, such systems are often unable to associate related aspects from different patterns of observed behavior, e.g., to learn to identify behavior being repeatedly performed by a criminal prior to breaking into cars parked in a parking lot.

Further, the static patterns that available video surveillance systems are able to recognize are frequently either under inclusive (i.e., the pattern is too specific to recognize many instances of a given object or behavior) or over inclusive (i.e., the pattern is general enough to trigger many false positives). In some cases, the sensitivity of may be adjusted to help improve the recognition process, however, this approach fundamentally relies on the ability of the system to recognize predefined patterns for objects and behavior. As a result, by restricting the range of objects that a system may recognize using a predefined set of patterns, many available video surveillance systems have been of limited usefulness.

SUMMARY OF THE INVENTION

One embodiment of the invention includes a computer-implemented method for storing an encoded percept in a long-term memory. The method may generally include initializing the long-term memory. The long term long-term memory includes a set of hard-locations, a weight matrix, and an activation function. The method may further include receiving a percept. The percept itself comprises a sub-graph of a neural network excited by an input stimulus. The method may further include encoding the percept as a bit pattern, generating a variable length entry in the set of hard locations, and storing the encoded percept as a hard location in the set of hard locations. The method may further include generating an entry in the weight matrix corresponding to the encoded percept.

Still another embodiment of the invention includes a computer-readable storage medium containing a program which, when executed by a processor, performs an operation for storing an encoded percept in a long-term memory. The operation may generally include initializing the long-term memory. The long-term memory itself includes a set of hard-locations, a weight matrix, and an activation function. The operation may also include receiving a percept. The percept itself may comprise a sub-graph of a neural network excited by an input stimulus. The operation may further include encoding the percept as a bit pattern, generating a variable length entry in the set of hard locations, and storing the encoded percept as a hard location in the set of hard locations. The operation may further include generating an entry in the weight matrix corresponding to the encoded percept.

Still another embodiment of the system having a video input source configured to provide a sequence of video frames, each depicting a scene. The system may also include a processor and a memory containing a machine learning application which when executed by the processor is configured to perform an operation for storing an encoded percept in a long-term memory. The operation may generally include initializing the long-term memory. The long-term memory itself includes a set of hard-locations, a weight matrix, and an activation function. The operation may also include receiving a percept. The percept itself may comprise a sub-graph of a neural network excited by an input stimulus. The operation may further include encoding the percept as a bit pattern, generating a variable length entry in the set of hard locations, and storing the encoded percept as a hard location in the set of hard locations. The operation may further include generating an entry in the weight matrix corresponding to the encoded percept.

BRIEF DESCRIPTION OF THE DRAWINGS

So that the manner in which the above recited features, advantages, and objects of the present invention are attained and can be understood in detail, a more particular description of the invention, briefly summarized above, may be had by reference to the embodiments illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
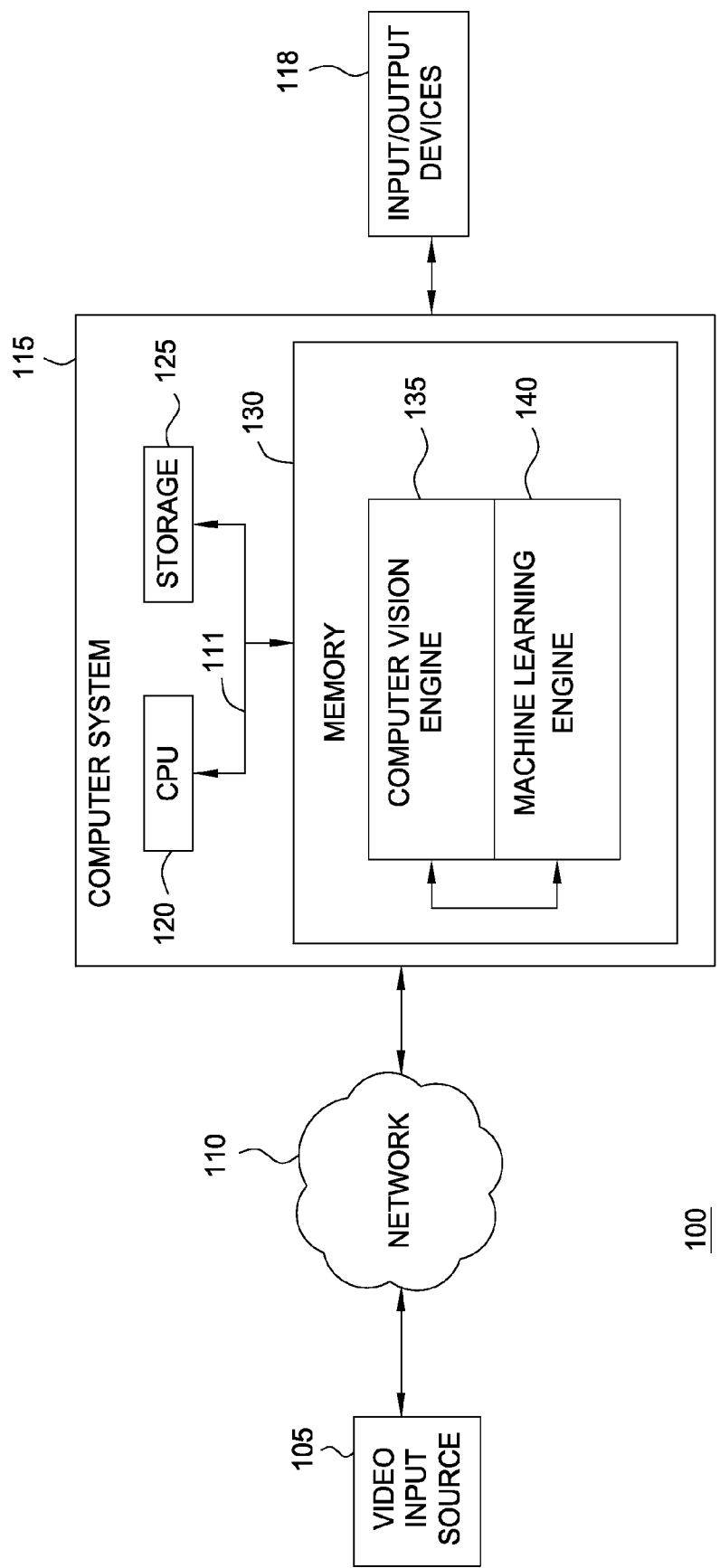
FIG. 1 illustrates components of a video analysis and behavior-recognition system, according to one embodiment of the present invention.

Embodiments of the invention provide a long-term memory used to store and retrieve information learned while a video analysis system observes a stream of video frames. The video analysis system may include a computer vision engine and a machine learning engine. The computer vision engine may be configured to receive and process a sequence of video frames. The machine learning engine may be configured to process the output of the computer vision engine. In one embodiment, the machine learning engine may include multiple data structures, referred to as memories, used to store and process information related to what is observed and perceived to have occurred within the scene. For example, the machine learning engine may include a perceptual memory, an episodic memory, and a long-term memory.

In one embodiment, the long-term memory provides a memory with a capacity that grows in size gracefully, as events are observed over time. Additionally, the long-term memory may encode events, represented by sub-graphs of a neural network, using a run-length encoding scheme, minimizing the storage requirements of the long-term memory. Further, rather than predefining a number of patterns recognized and manipulated by the long-term memory, embodiments of the invention provide a long-term memory where the size of a feature dimension (used to determine the similarity between different observed events) may grow dynamically as necessary, depending on the actual events observed in a sequence of video frames. As a result, the dimensions of a weight matrix used to encode patterns (and to reinforce/decay memories stored in the long-term memory) expand dynamically in response to changes in the feature dimension. That is, the information stored in the long-term memory is driven by the actual events observed in a scene.

As events occur, and re-occur, patterns encoding the events are stored and reinforced in the long-term memory. Additionally, the overhead required to store and retrieve information from the long-term memory is minimized due to the ability of the weight matrix and the feature dimension to grow as necessary. The storage capacity of the long-term memory is limited only by the memory capacity of the computer.

In the following, reference is made to embodiments of the invention. However, it should be understood that the invention is not limited to any specifically described embodiment. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Examples of computer-readable storage media include (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks.

In general, the routines executed to implement the embodiments of the invention may be part of an operating system or a specific application, component, program, module, object, or sequence of instructions. The computer program of the present invention is comprised typically of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 illustrates components of a video analysis and behavior-recognition system 100, according to one embodiment of the present invention. As shown, the behavior-recognition system 100 includes a video input source 105, a network 110, a computer system 115, and input and output devices 118 (e.g., a monitor, a keyboard, a mouse, a printer, and the like). The network 114 may transmit video data recorded by the video input 112 to the computer system 115. Illustratively, the computer system 115 includes a CPU 120, storage 125 (e.g., a disk drive, optical disk drive, floppy disk drive, and the like), and a memory 130 containing a computer vision engine 135 and a machine learning engine 140. The computer vision engine 135 and the machine learning engine 140 may provide software applications configured to analyze a sequence of video frames provided by the video input 112.

Network 110 receives video data (e.g., video stream(s), video images, or the like) from the video input source 105. The video input source 105 may be a video camera, a VCR, DVR, DVD, computer, web-cam device, or the like. For example, the video input source 105 may be a stationary video camera aimed at a certain area (e.g., a subway station, a parking lot, a building entry/exit, etc.), which records the events taking place therein. Generally, the area visible to the camera is referred to as the "scene." The video input source 105 may be configured to record the scene as a sequence of individual video frames at a specified frame-rate (e.g., 24 frames per second), where each frame includes a fixed number of pixels (e.g., 320×240). Each pixel of each frame may specify a color value (e.g., an RGB value) or grayscale value. Further, the video stream may be formatted using known such formats e.g., MPEG2, MJPEG, MPEG4, H.263, H.264, and the like.

As described in greater detail below, the computer vision engine 135 may be configured to analyze this raw information to identify active objects in the video stream, classify the objects, derive a variety of metadata regarding the actions and interactions of such objects, and supply this information to a machine learning engine 140. In turn, the machine learning engine 140 may be configured to evaluate, observe, learn and remember details regarding events (and types of events) that transpire within the scene over time.

In one embodiment, the machine learning engine 140 receives the video frames and the results generated by the computer vision engine 135. The machine learning engine 140 may be configured to analyze the received data, build semantic representations of events depicted in the video frames, detect patterns, and, ultimately, to learn from these observed patterns to identify normal and/or abnormal events. In one embodiment, data describing whether a normal/abnormal behavior/event has been determined and/or what such behavior/event is may be provided to output devices 118 to issue alerts, for example, an alert message presented on a GUI interface screen. In general, the computer vision engine 135 and the machine learning engine 140 both process video data in real-time. However, time scales for processing information by the computer vision engine 135 and the machine learning engine 140 may differ. For example, in one embodiment, the computer vision engine 135 processes the received video data frame-by-frame, while the machine learning engine 140 processes data every N-frames. In other words, while the computer vision engine 135 analyzes each frame in real-time to derive a set of information about what is occurring within a given frame, the machine learning engine 150 is not constrained by the real-time frame rate of the video input.

Note, however, FIG. 1 illustrates merely one possible arrangement of the behavior-recognition system 100. For example, although the video input source 105 is shown connected to the computer system 115 via the network 110, the network 110 is not always present or needed (e.g., the video input source 105 may be directly connected to the computer system 115). Further, various components and modules of the behavior-recognition system 100 may be implemented in other systems. For example, in one embodiment, the computer vision engine 135 may be implemented as a part of a video input device (e.g., as a firmware component wired directly into a video camera). In such a case, the output of the video camera may be provided to the machine learning engine 135 for analysis. Similarly, the output from the computer vision engine 135 and machine learning engine 140 may be supplied over computer network 110 to other computer systems. For example, the computer vision engine 135 and machine learning engine 140 may be installed on a server system and configured to process video from multiple input sources (i.e., from multiple cameras). In such a case, a client application running on another computer system may request (or receive) the results of over network 110.

Figure 2:
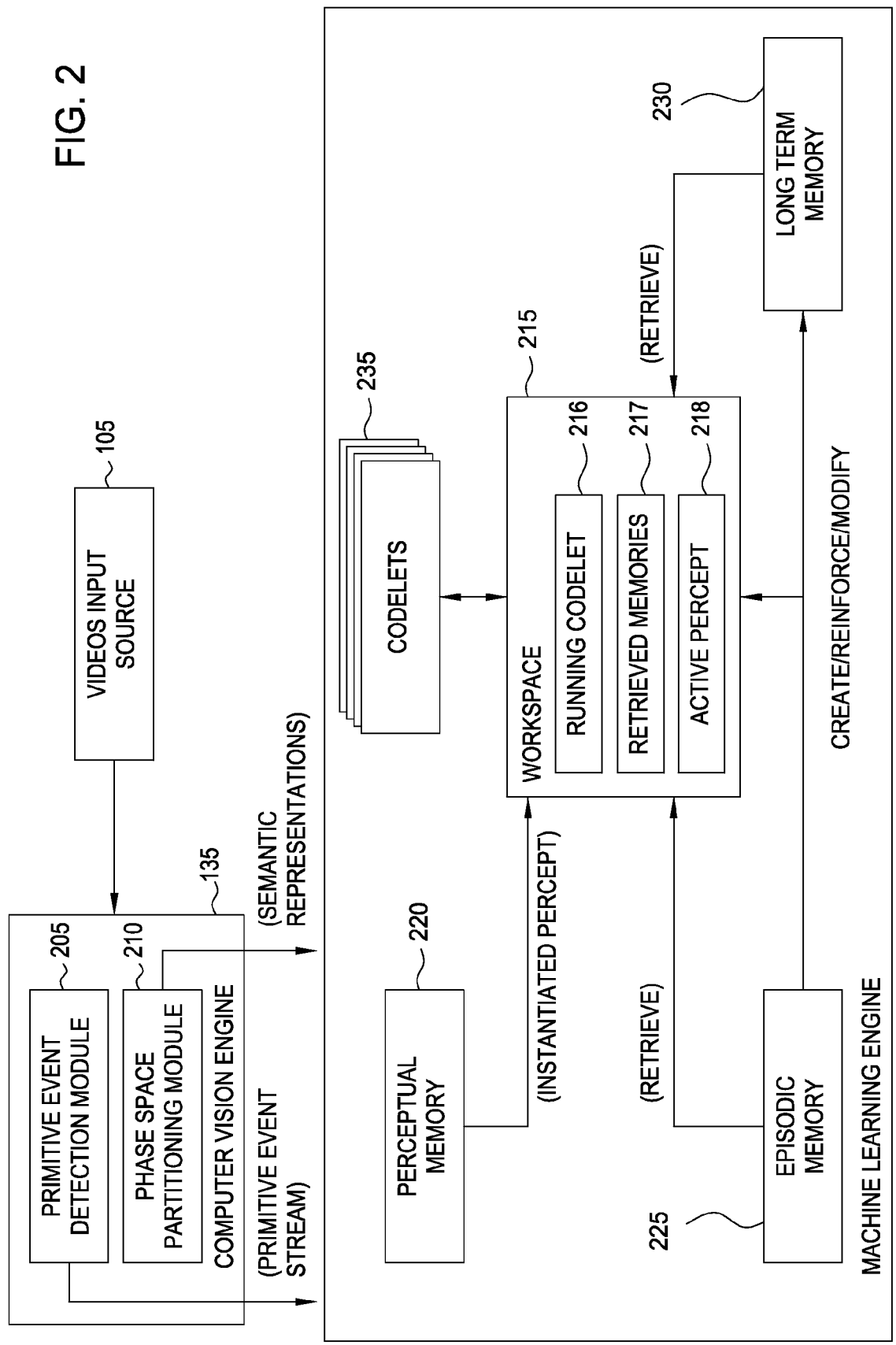
FIG. 2 further illustrates components of the computer vision engine and the machine learning engine first illustrated in FIG. 1, according to one embodiment of the present invention.

FIG. 2 further illustrates components of the computer vision engine 135 and the machine learning engine 140 first illustrated in FIG. 1, according to one embodiment of the present invention. As shown, the computer vision engine 135 includes a primitive event detection module 205 and a phase space partitioning module 210. In one embodiment, the phase space partitioning module 210 may be configured to generate a variety of contextual and kinematic data related to the scene depicted in a sequence of video frames. For example, the computer vision engine 135 may, over a sequence of frames, develop a background/foreground model of the scene indicating which elements of a given frame depict scene background and which elements depict foreground objects.

Once the background and foreground of the scene is identified, objects in the scene foreground may be classified as being some type of thing, based on the features or characteristics of a given object. For example, a classifier may receive the pixels believed to depict the foreground object along with other data related to its kinematics, pose, position, etc. From this information, the classifier may classify the object as depicting, e.g., a car or a person, or something else, depending on the capabilities of the classifier. Further, in one embodiment, the phase space partitioning model 210 may be configured to identify regions of the background image and identify contextual information about each region, e.g., whether one region is in front of (or behind) another. From this information, the phase space partitioning module 210 may determine dimensionality and geometry of both background and foreground elements. For example, assume the phase space partitioning module 210 identifies a blob of pixels as depicting a human individual and that the blob is 30 pixels in height. This provides a convenient mechanism for estimating the size of objects in the scene, based on the average height of a person.

In one embodiment, the primitive event detection module 205 may be configured to identify what activity a given object is engaged in using the classification and other data generated by the computer vision engine 135 and the phase space partitioning module 210. Further, the primitive event detection module 205 may generate a stream of primitive events describing what activity is observed to have occurred. For example, assume the computer vision engine 135 has identified a foreground object and classified that foreground object as being a car. In such a case, the primitive event detection module 205 may determine that the car has engaged in some specified action. For example, a sequence of primitive events related to events occurring at a shopping-mall parking lot could include: "car appears in scene," "car moves to a given location," "car stops moving," "person appears proximate to car" "person moves," "person leaves scene" "person appears in scene," "person moves proximate to car," "person disappears," "car starts moving," and "car disappears." This information (labeled in FIG. 2 as "primitive event stream") along with other information generated by the computer vision engine 135 (labeled in FIG. 2 "semantic representations") is passed to the machine learning engine 140.

Illustratively, the machine learning engine 140 includes a workspace 215, a perceptual memory 220, an episodic memory 225, a long-term memory 230, and codelets 235. In one embodiment, the perceptual memory 220, the episodic memory 225, and the long-term memory 230 are used to identify patterns of behavior, evaluate events that transpire in the scene, and encode and store observations.

Generally, the perceptual memory 220 receives the output of the computer vision engine. The episodic memory 225 stores data representing observed events with details related to a particular episode, e.g., information describing time and space details related on an event. That is, the episodic memory 225 may include details describing "what and where" something occurred within a scene such as a particular car (car A) moved to a location believed to be a parking spot (parking spot 5) at 9:43 AM. The long-term memory 230 may store data generalizing events observed in the scene.

To continue with the example of a car parking, the long-term memory 230 may encode information related to observations learned by an analysis of the behavior of objects in the scene such as "cars tend to park in a particular place," "when parking cars tend to move a certain speed," and "after a car parks, people tend to appear in the scene," etc. Thus, the long-term memory 230 stores observations about what happens within a scene with much of the particular episodic details stripped away. In this way, when a new event occurs, memories from the episodic memory 225 and the long-term memory 230 may be used to relate and understand a current event, i.e., the new event may be compared with past experience, leading to both reinforcement, decay, and adjustments to the information stored in the long-term memory 230, over time.

In one embodiment, the perceptual memory 220 may be implemented as a neural network configured to receive the primitive event stream and other information from the computer vision engine 135. In such a case, the primitive event stream provides a stimulus be used to excite a group of nodes present in the neural network (referred as a percept). Once excited by input data from the computer vision engine 135, the percept may be copied into the workspace 215 (illustrated in FIG. 2 as an active percept 218). When a percept is instantiated into the workspace 215, memories may be retrieved from the episodic memory 225 and the long-term memory 230 (illustrated in FIG. 2 as retrieved memories 217) to relate and understand a current event as well as to compare the current event to past experience. In one embodiment, the memories in the episodic memory 225 and long-term memory 230 are themselves represented as percepts. That is, the memories may be represented as directed graphs (or subgraphs) similar to the neural network built-up as the perceptual memory 220 observes the information from the computer vision engine 135. Thus, each percept encodes information related to an observed event.

Generally, the workspace 215 provides a computational engine for the machine learning engine 140. For example, the workspace 215 may be configured to copy percepts from the perceptual memory 220 (i.e., to copy a sub-graph of a neural network that was excited by events observed by the computer vision engine 135), retrieve relevant memories from the episodic memory 225 and the long-term memory 230, select and invoke the execution of one of codelets 235 (illustrated as FIG. 2 as running codelet 216). In one embodiment, each codelet 235 is a software program configured to evaluate different sequences of events and to determine how one sequence may follow (or otherwise relate to) another (e.g., a finite state machine). More generally, the codelet may provide a small software program configured to find interesting patterns. In turn, the codelet may create, reinforce, or modify memories in the episodic memory 225 and the long-term memory 230 (i.e., when a pattern is identified). By repeatedly scheduling codelets for execution, copying memories and percepts to/from the workspace 215, the machine learning engine 140 performs a cognitive cycle used to observe, and learn, about patterns of behavior that occur within the scene.

Figure 3A:
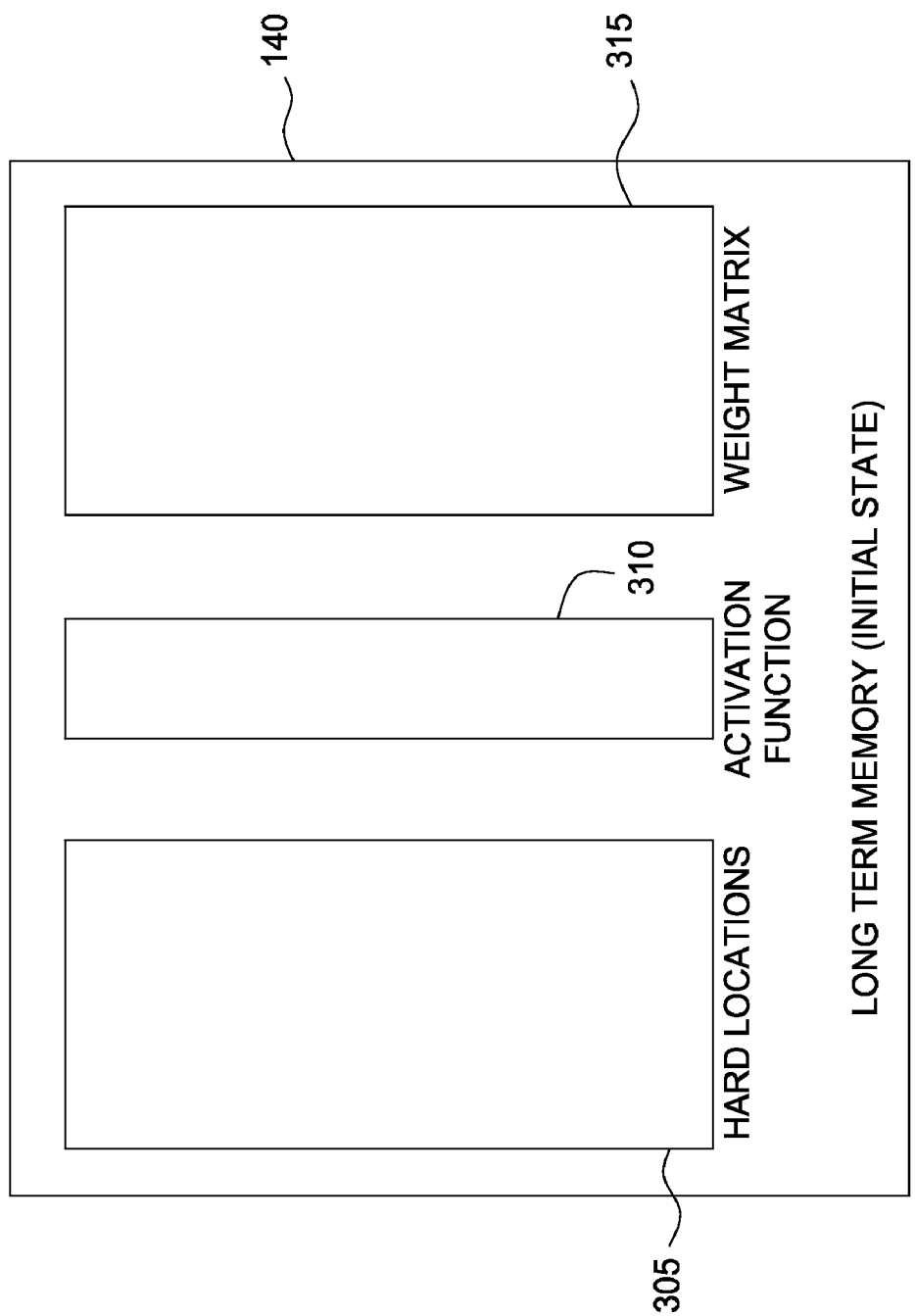
FIGS. 3A-3D illustrate a long-term memory used to create, store, reinforce, and modify memories represented as encoded percepts, according to one embodiment of the invention.

FIGS. 3A-3D illustrate a long-term memory 140 used to create, store, reinforce, and modify memories (represented as encoded percepts), according to one embodiment of the invention. First, FIG. 3A illustrates the initial state of a long-term memory 140. In a particular embodiment, the long-term memory is implemented as a sparse distributed memory data structure. As shown, the long-term memory 230 includes a null set of hard locations 305, an activation function 310, and a null weight matrix 140. As illustrated in greater detail below in conjunction with FIGS. 3B-3D the hard locations 305 store encoded patterns of percepts—sorted into different classes or categories. That is, each hard location 305 corresponds to a category of event with different variations (e.g., a car parking stopping starting etc.). In one embodiment, hard locations 305 may be implemented as an adaptive resonance theory (ART) network and ART network locations (i.e., hard locations 305) may be created and/or modified according to vigilance parameter and choice parameter. As memories (i.e., percepts) are selected to be stored in the long-term memory 140 (e.g., as a codelet operates on an excited percept), the hard locations 305 are used to determine whether to create a new memory in the long-term memory or to modify the weights in the weight matrix 140 associated with an existing hard location 305. Thus, the size of the hard locations in the weight matrix 140 is dynamic.

Figure 3B:
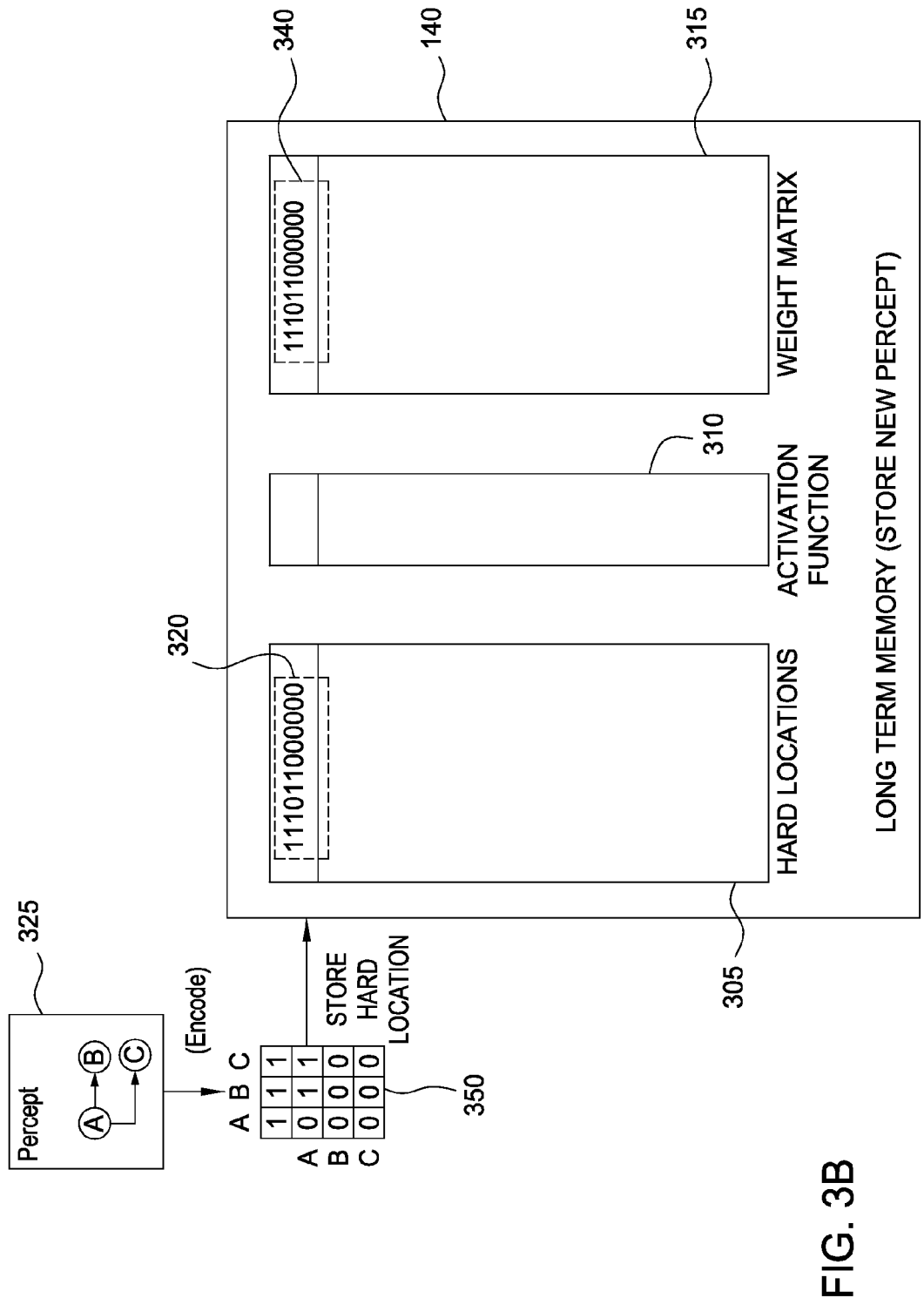

FIG. 3B illustrates an example of a new percept 325 being encoded and stored in long-term memory 140. As shown, the percept 325 includes a directed graph of three nodes, "A," "B," and "C," and edges from node "A" to both nodes "B" and "C." Assume for this example, that nodes "A," "B," and "C" form a percept related to a parking event observed in the scene and that these nodes were excited in the perceptual memory 220 by input from the computer vision engine 135. In such a case, the percept 325 may be copied into the workspace 215 and evaluated using a codelet 235. Further, the nodes in percept 325 could represent subject kinematics (i.e., the position and motion of an object classified as a car), a node in the neural network representing a parking event, and a node representing a parking space. Illustratively, the percept 325 is encoded as a matrix 330. The first row of the matrix 330 is used to indicate whether a given node is present in the percept 325. The remaining rows of the matrix 330 are used to present whether a directed link exists from one of the nodes (per row) to another one of the nodes (per column). For example, the second row encodes the links from A→B and A→C present in percept 325. Once encoded, the percept 325 may be stored as a new hard location 320. Illustratively, the percept is encoded as a hard location 320 in hard locations 305. Alternatively, the hard location 320 may be compressed using a run-length encoding scheme. Doing so may allow the dynamic increase of the features and the weight matrix.

In one embodiment, the hard location for a percept is created as a bit pattern generated by copying the values of the encoded matrix, in row order. Note, this approach allows the hard locations 305 to include each feature dimension in the encoded percept (i.e., each node and link between nodes in a percept). Further, as this is the first time the percept 325 (or any percept) has been stored in long-term memory 140, the matrix 330 is copied directly into the weight matrix 315 as entry 340. That is, like the hard location 320, the matrix 300 is copied to entry 340 in row order. Each entry in the weight matrix represents one of the feature dimensions for the memory. Subsequently, as similar memories (i.e., percepts that categorize to the same hard location 320 or are within a minimum distance to hard location 320) are stored in the long-term memory 140, the weights for each feature dimension in weight matrix 315 associated with hard location 320 are reinforced (positively or negatively).

Figure 3C:
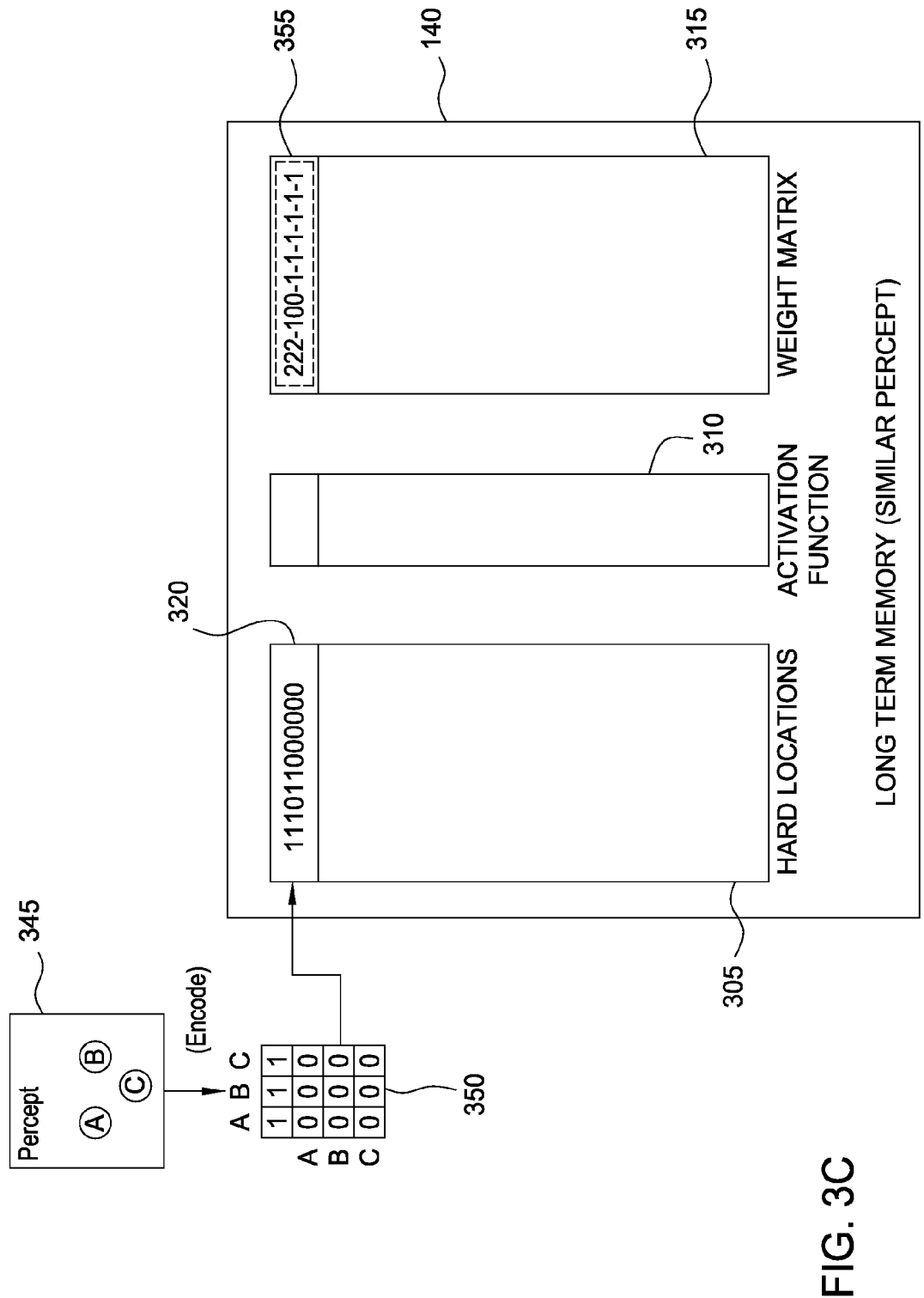

For example, FIG. 3C illustrates a second percept 345 being stored in the long-term memory 140, according to one embodiment of the invention. Illustratively, the percept 345 includes the same nodes "A," "B," and "C," as node 325, but lacks the links from node "A" to nodes "B" and "C." Thus, the percept 345 and 235 share some, but not all feature dimensions in common. In this case, the hard locations 305 (e.g., an ART network) has decided to modify existing memories for an existing hard location. (e.g., by using a vigilance and choice function). The percept 345 is encoded in a matrix 350 using the same encoding scheme of matrix 330 of FIG. 3B. Note, in this example, the feature dimensions in percept 345 are the same as percept 325 (i.e., each includes nodes "A," "B," and "C,"), thus, the dimensionality of the hard locations 305 is unchanged by encoding this percept. Once the appropriate hard location is identified (in this example, hard location 320), the activation function 310 is used to activate one or more of the memories encoded in weight matrix 315. In one embodiment, the activation function 310 calculates a Hamming distance between the hard location and the encoded percept retrieve related experiences using one or more entries in the weight matrix 315. In an alternative embodiment, where the hard locations are implemented as an adaptive resonance theory (ART) network, the choice function and vigilance function may be determined directly from an ART network. Once identified, the weights of each feature dimension in an activated entry are adjusted. That is, the current encoded percept is used to reinforce (positively and negatively) the feature dimension values for one or more entries of the weight matrix 315. Illustratively, the encoded percept 350 is used to reinforce the weight matrix entry 340. In one embodiment, the reinforcement occurs by converting each "0" value in the encoded percept to a −1 and then adding each feature dimension the percept to the weights. Doing so results in a match between values in the encoded percept and the weights to increase a weight value. For example, a match between two "1" values reinforces that weight (resulting in weights with a grater positive magnitude) and match between two 0 values (after being converted to a −1 values) results in weights with a greater negative magnitude. Table I, below, illustrates the reinforcement for the weights corresponding to hard location 320 after encoded percept 350 is applied.

includes nodes "D" and "E." That is, percept 345 includes different feature dimensions. Continuing with the example of a car parking, node "D" could represent a person appearing in the scene (e.g., when exiting a parked car) and node E could represent kinematics associated with the person. Because the encoded percept 365 represents a different general category of event from the encoded percepts 325 and 345, a new hard location 375 is used to represent this percept in hard locations 305. Note, matrix 370 now includes columns for the new nodes "D" and "E" not present in the matrices 330 and 350. Accordingly, the hard locations 305 grow to accommodate the nodes not present in the other encoded percepts (i.e., percepts 325 and 345). In one embodiment, this is determined by the ART network used to represent hard locations 320. Thus, this example embodiment illustrates how the hard locations 305 in the long-term memory 140 can grow gracefully as new events are observed by the computer vision engine 135, resulting in new nodes in the neural network of the perceptual memory 220 being encoded in the long-term memory 230. Additionally, an entry 360 in the weight matrix corresponding to node 375 is initialized using the values of matrix 370 encoding percept 365. Like the entry 340 used to initialize weight matrix for percept 325, entry 360 copies the values from the matrix 370, in row-order. Thereafter as other percept configurations are stored in long-term memory 140, the values in entry 360 of the weight matrix 315 are reinforced (either positively or negatively), up to the magnitude cutoff (e.g., +/−16).

Figure 4A:
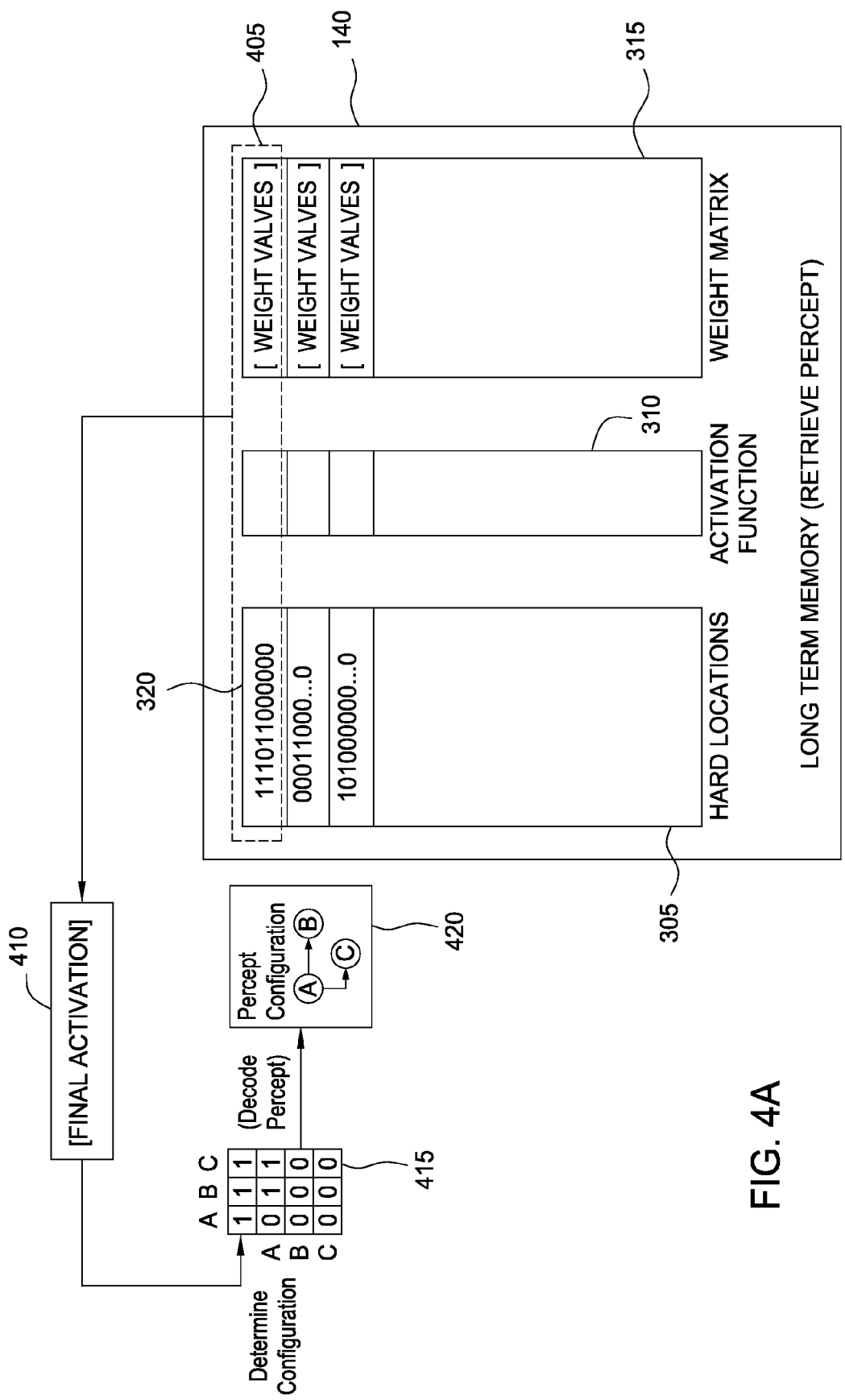
FIGS. 4A-4B illustrate encoded percepts retrieved from a long-term memory in response to an input stimulus, according to one embodiment of the invention.
Figure 4B:
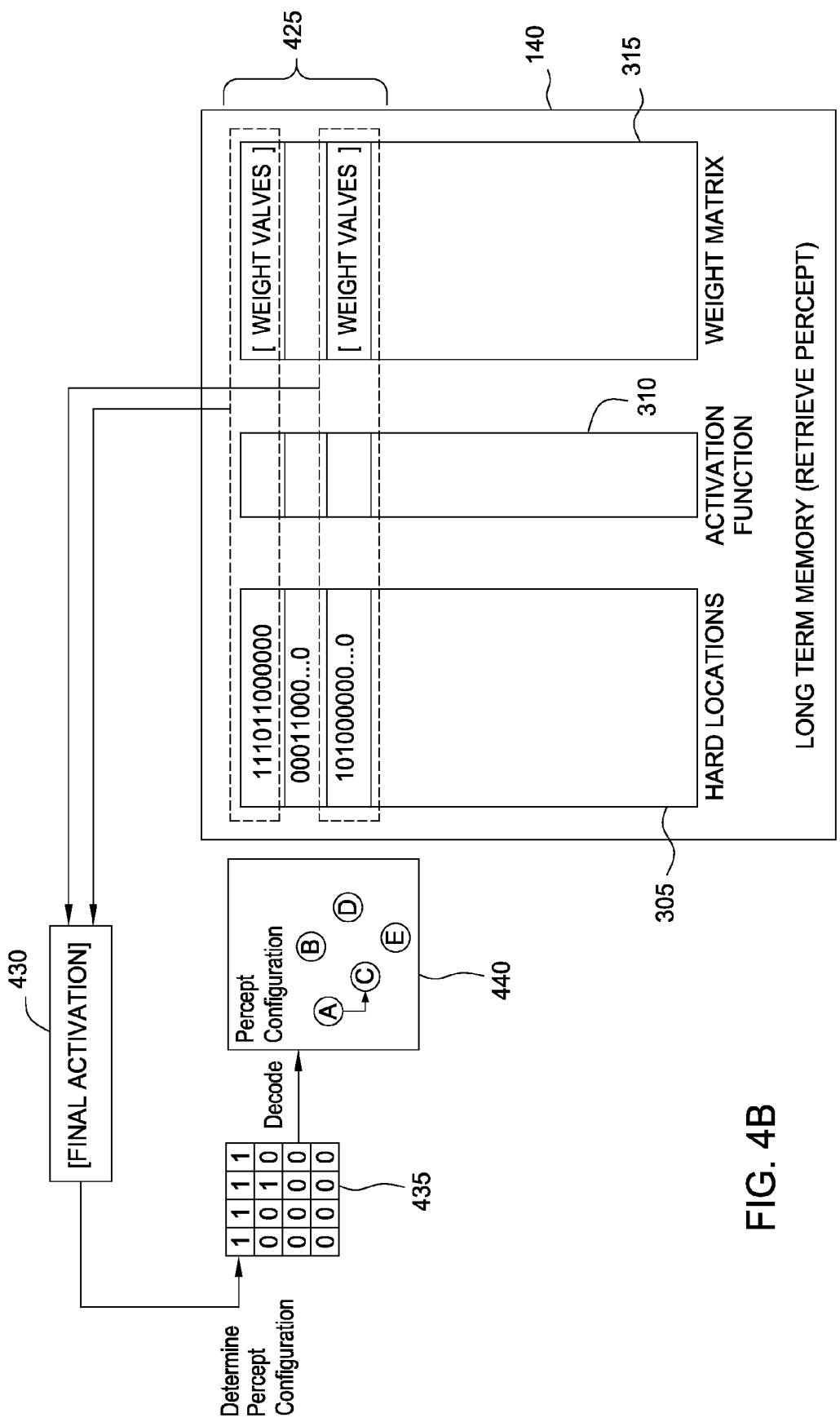

In addition to storing memories in long-term memory 140 (as encoded percepts), percepts may be retrieved from long-term memory. For example, one percept may be used to activate certain memories in the long-term memory 140, and the activated memories may themselves be used to construct a percept. For example, FIGS. 4A-4B illustrate percepts being retrieved from the long-term memory 140 in response to an input stimulus, according to one embodiment of the invention. The activation function 310 is used to select one or more hard locations 305 to activate. In this example, which hard locations 305 are activated is determined using a Hamming distance (i.e., using activation function 310). As is known, a Hamming distance specifies how distinct two input bit sequences are by counting the number of bit-wise differences between the inputs. By setting a Hamming distance threshold, only hard locations 305 with a Hamming distance below the threshold are activated. In one embodiment, this may be calculated from data was already stored in the hard locations 320. That is, only hard locations with a sufficient similarity to the input string are activated. Of course the

TABLE I

Positive and Negative memory reinforcement

| 1 | 1 | 1 | 0 | 1 | 1 | 0 | 0 | 0 | 0 | 0 | 0 | (weights as initially encoded from percept 325) |
|---|---|---|---|---|---|---|---|---|---|---|---|---|
| +1 | 1 | 1 | −1 | −1 | −1 | −1 | −1 | −1 | −1 | −1 | −1 | (percept 345 as applied to reinforce memory) |
| 2 | 2 | 2 | −1 | 0 | 0 | −1 | −1 | −1 | −1 | −1 | −1 | (resulting values for this memory in weight matrix 315) |

In one embodiment, the resulting values in weight matrix 315 may have a maximum magnitude. That is, the reinforcement (positive or negative) is cut-off after reaching a certain value. While such a cut-off may be tailored to suit the needs of a given case, a cut-off of +/−16 has proven to be an effective.

Figure 3D:
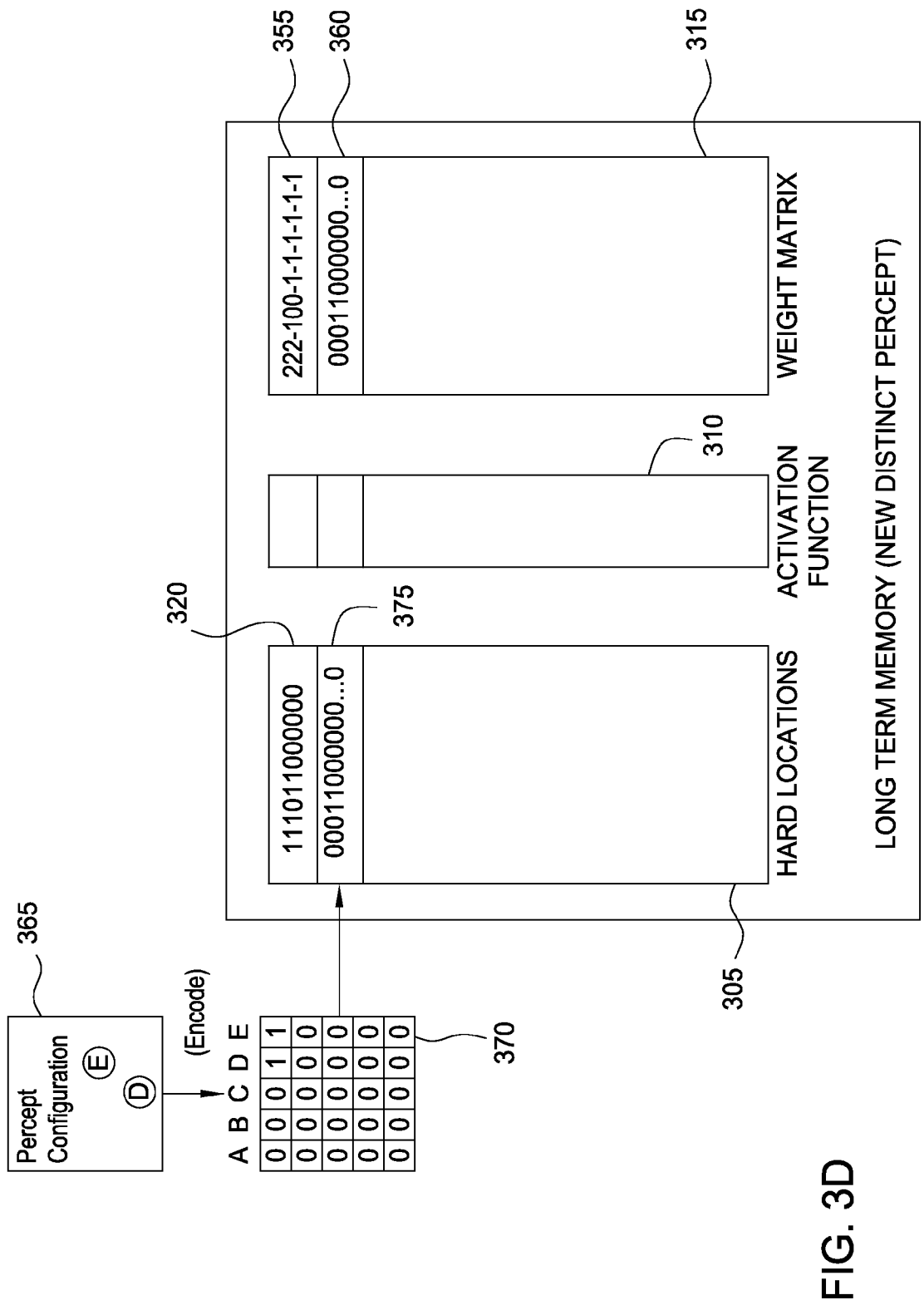

FIG. 3D illustrates a third percept 345 being stored in the long-term memory 140, according to one embodiment of the invention. Unlike the percept 345 of FIG. 3C, the percept 365 is dissimilar to percept 320 of FIG. 3A. For example, percept 365 does not include any of the nodes "A," "B," or "C," and threshold may be tailored to suit the needs of an individual case. Further, although illustrated using a Hamming distance, one of skill in the art will recognize that an ART distance measure calculated between the input to the ART network and the existing hard locations may also be used. In such a case, hard locations within a specified threshold of the input (as determined using the distance measure between the input and a given hard location) are activated.

Additionally, as shown in FIGS. 4A-4B, encoded percepts are stored in the long term memory in a single pass, i.e., the results of the activation function are used to to determine a final activation. However, one of ordinary skill in the art will recognize that this process may be performed recursively. For example, a first final activation returned for a first input may itself be supplied as a second input to the long term memory, resulting in a second final activation itself also input to the long term memory. This process may continue until a reaching a steady state and the resulting steady-state final activation may be returned as an activated memory responsive to the original input stimulus.

As shown in FIG. 4A, a single hard location is to be activated based on an input, specifically, the hard location enclosed by dashed lines 405. The selected location is copied as final activation 410. In one embodiment, the final activation 410 is determined using the weights corresponding to the hard locations activated by the input. As only one hard location 305 is activated in the example of FIG. 4A, the values for the corresponding weight matrix are used to generate an encoded matrix 415. In one embodiment, each positive weight value is converted to a "1" and each negative (or 0) value is converted to a 0 in encoded matrix 415. The encoded matrix is then decoded using the same encoding scheme used to encode percepts. That is, the matrix is then decoded to generate a percept returned as a response to a request to retrieve memories corresponding to an input percept. Illustratively, matrix 415 is decoded to create percept 420.

FIG. 4B shows a second example of a memory being retrieved from the long-term memory 140, according to one embodiment of the invention. Unlike the example of FIG. 4A, FIG. 4B shows multiple hard locations being activated and combined as a response to an input percept. Illustratively, hard locations 425 are to be activated based on an input. Thus, in this example assume that a Hamming distance determined for each of the hard locations 425 are within the Hamming distance threshold. Once the hard locations to activate have been identified, the corresponding weight matrix values are used to create final activation 430. In one embodiment, the final activation 430 may be determined by adding the weights associated with each activated hard location and converting the weights to an encoded percept matrix (i.e., matrix 435) using the same decoding scheme discussed above (converting each positive weight to a 1 and each negative (or zero) weight to a −1). By adding the weights from multiple hard locations 305, the resulting percept may capture and combine many different memories related to the input percept.

Figure 5:
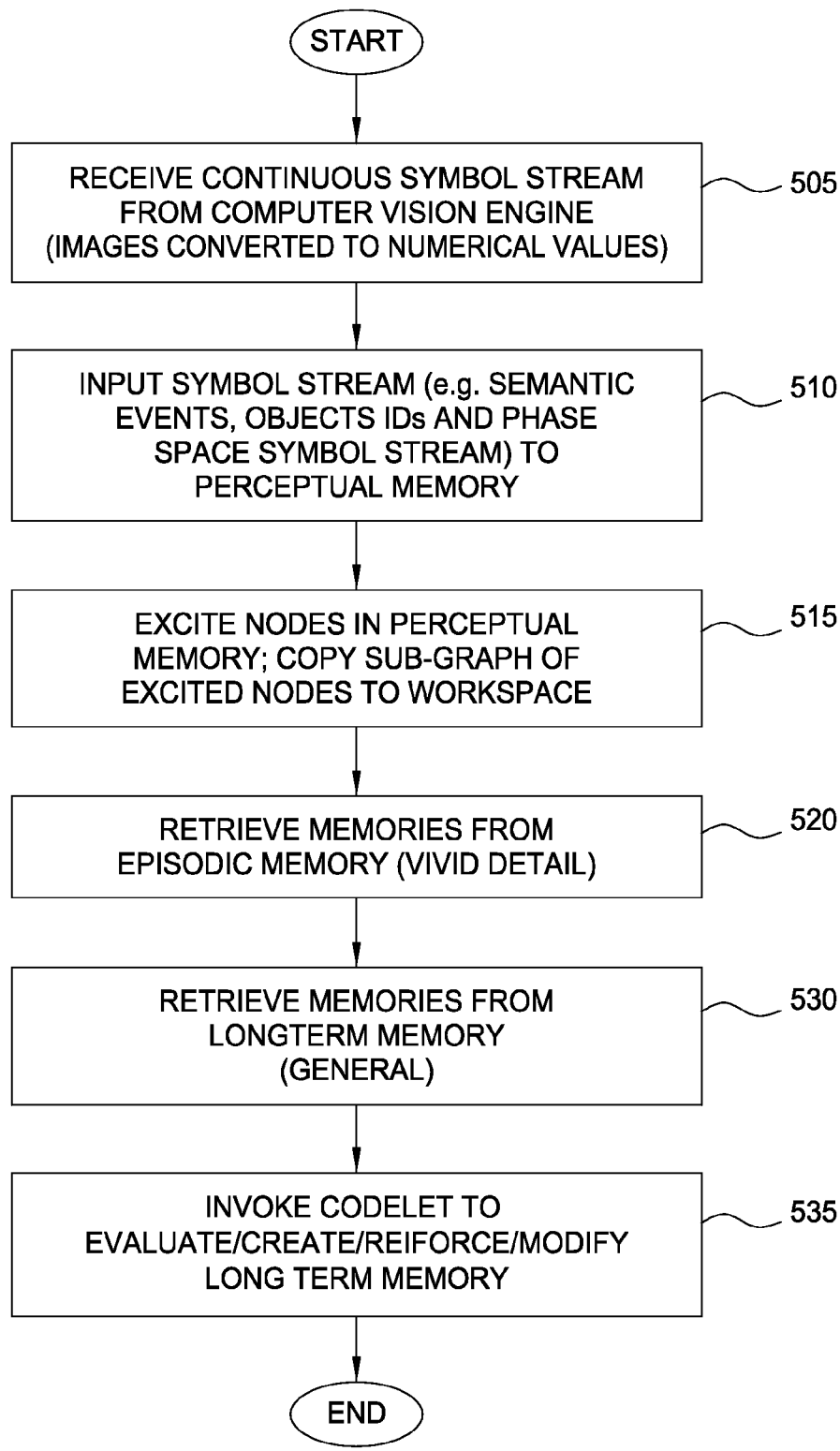
FIG. 5 illustrates a method for processing information received from a computer vision engine, according to one embodiment of the invention.

FIG. 5 illustrates a method 500 for processing information received from a computer vision engine, according to one embodiment of the invention. As shown, the method 500 begins at step 505 where the machine learning engine 140 begins receiving information from a computer vision engine. As described above, the information may include a semantic event stream and a phase space symbol stream generated from a sequence of video frames. More generally, the computer vision engine converts image data to numerical values, and the machine learning engine converts these numerical values to symbolic representations. At step 510, the input symbol stream received at step 505 is input to a perceptual memory. In response, at step 515, the input symbols may excite certain nodes of the perceptual memory. The group of nodes excited by a given input stimulus in the perceptual memory (i.e., a sub graph of a neural network maintained by the perceptual memory) is copied to a workspace. At step 520, memories similar to the input stimulus (i.e. the sub-graph copied to the work space) may be retrieved from the episodic memory 225. As described above, memories in the episodic memory 225 may include time and space details related to a particular event. At the same time, memories similar to the input stimulus may also be retrieved from the long-term memory 140. For example, as illustrated above in FIGS. 4A and 4B, hard locations similar to the input stimulus may be selected using an activation function (e.g., a Hamming distance), and combined using a set of weights corresponding to each activated hard location. Once the episodic memories and long-term memories relevant to a current event which exited the perceptual memory are retrieved, the workspace may invoke a codelet used to relate and understand a current event, i.e., the new event may be compared with past experience, leading to both reinforcement, decay, and adjustments to the information stored in both the episodic memory and the long-term memory 230 over time.

Figure 6:
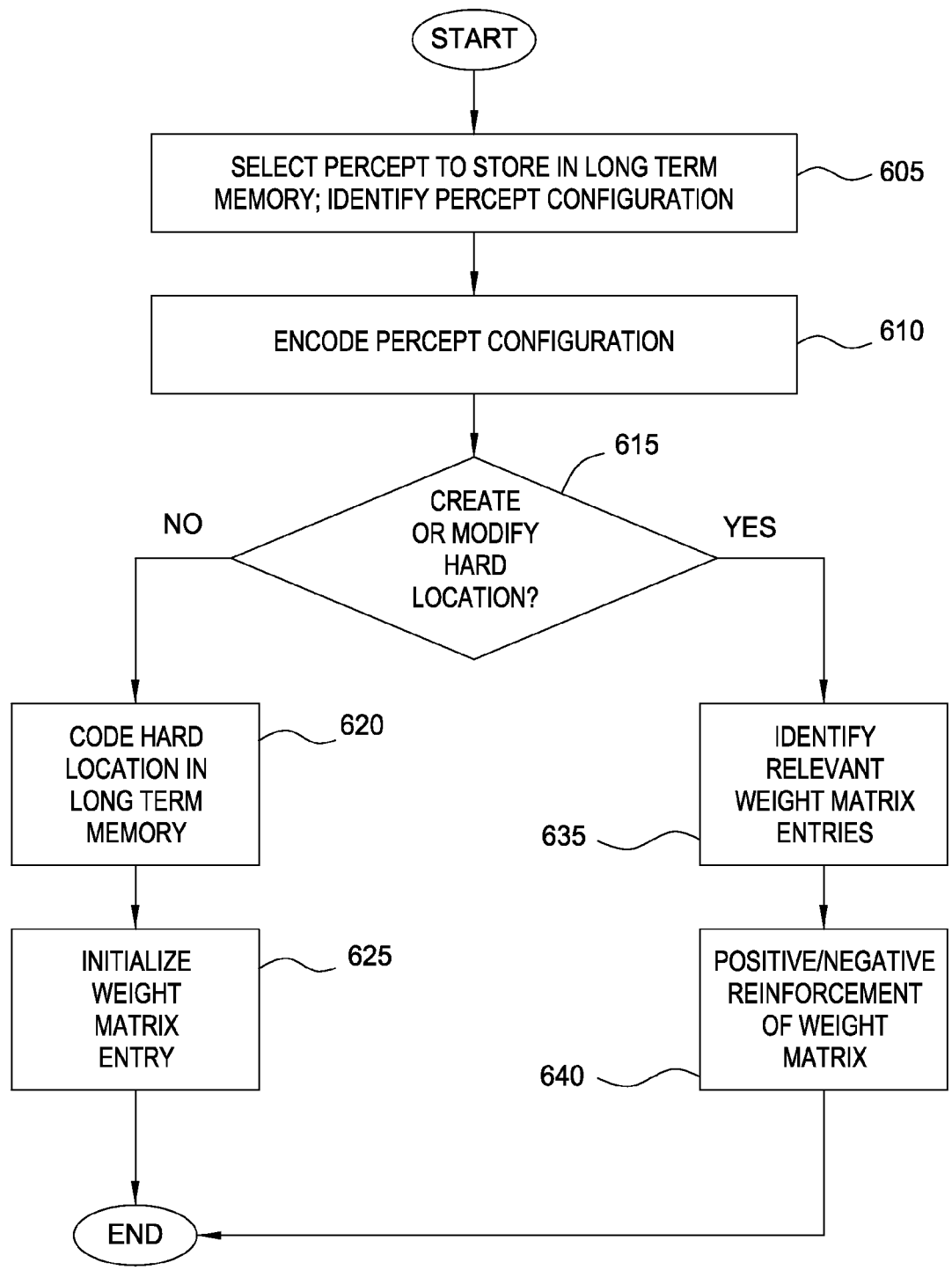
FIG. 6 illustrates a method for storing an encoded percept in a long-term memory, according to one embodiment of the invention.

FIG. 6 illustrates a method 600 for storing an encoded percept in a long-term memory, according to one embodiment of the invention. Generally, the data flow begins with information excited from the perceptual memory 220 (i.e., a percept) flowing to the workspace where it is evaluated by a codelet. A percept with successful codelet execution may be moved from the workspace to the episodic memory 225. The percept may be stored in the episodic memory 225 in a manner which includes time and space details of the event perceived by the perceptual memory 220 (as encoded in the percept). When the percept in the episodic memory 225 is mature, i.e., has been in the episodic memory 225 for a sufficient period of time (which may require the percept to be reinforced), the percept may be moved to the long-term memory. In such cases, the percept may be used to create a new long-term memory or reinforce existing long-term memories or both.

As shown, the method 600 begins at step 605 where a percept is selected from the episodic memory to be stored in the long-term memory. For example, a codelet may select to encode a percept in long-term memory when that percept is excited by input from the computer vision engine with a relatively high frequency. That is, events that occur more frequently are likely to be encoded in the long-term memory (and reinforced), where infrequently occurring events are not. At step 610, the percept is encoded. For example, FIGS. 4B-4D illustrate different percepts being encoded into a matrix format. Further, as stated, the encoded format may be compressed using a run-length encoding scheme (or other compression scheme). Doing so may allow the size of the feature space to be variable. Once encoded, at step 615 it is determined whether to create or reinforce information in the long term memory. If a new hard location is to be used, at steps 620-630, the percept is used to create a new hard location (i.e., a new memory) in the long-term memory. Specifically, at step 620, the encoded percept is used to generate a new hard location value. And at step 625, the weight matrix is initialized for the new hard location. For example, FIGS. 3B and 3D illustrate an embodiment where a percept is encoded as a matrix, and the matrix itself is then encoded as a hard location using a row-order of the matrix. Returning to step 615, if the encoded percept is used to reinforce one or more existing memories, then the percept is used to modify (i.e., to reinforce) the weight values associated with the hard location to which the encoded percept is similar. At step 635, the corresponding weight matrix entries are identified. And at step 640, the weight matrix values are updated. For example, in one embodiment, the encoded percept is added to the weight values, as described above in conjunction with FIG. 3C.

Figure 7:
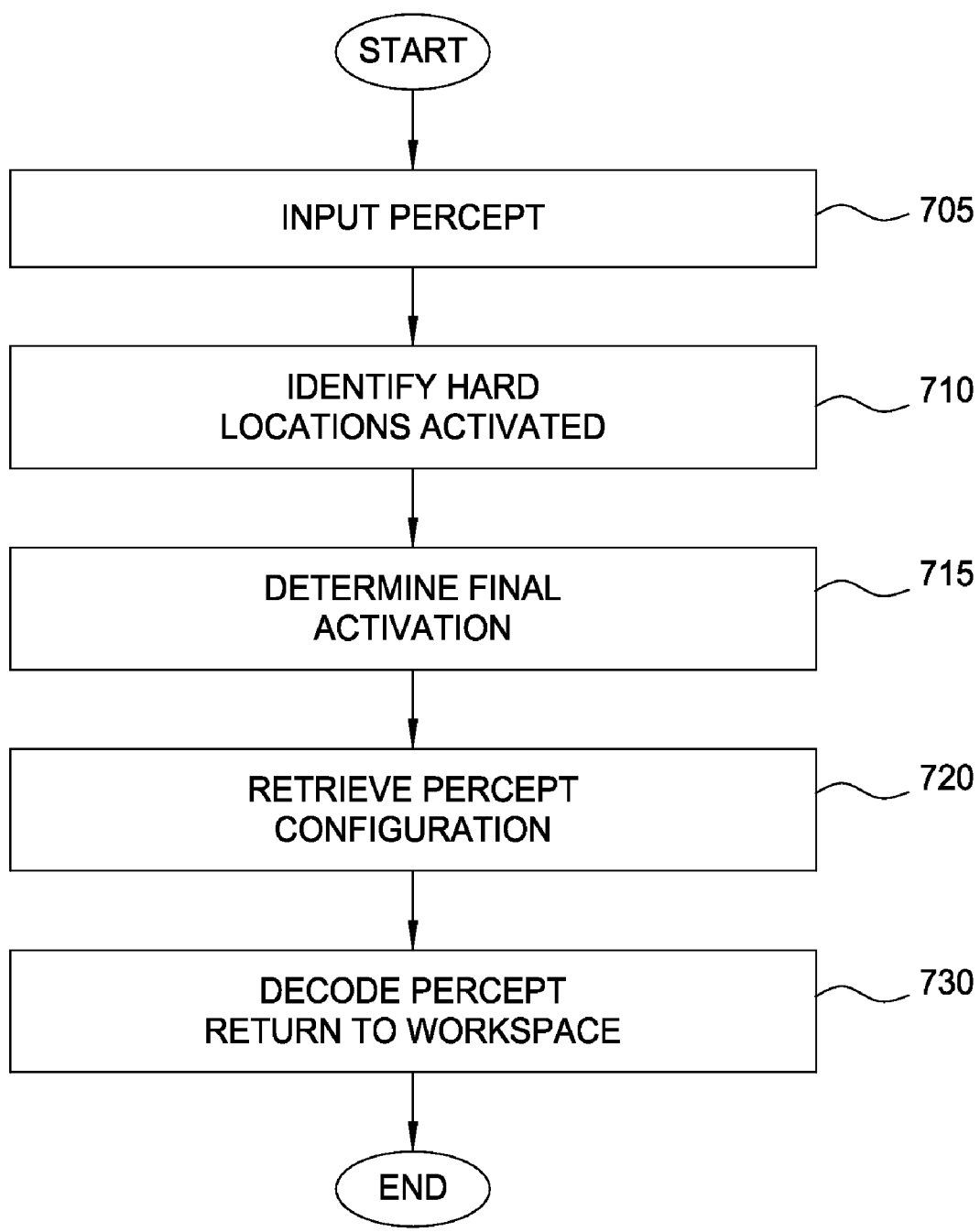
FIG. 7 illustrates a method for retrieving an encoded percept from the long-term memory in response to an input stimulus, according to one embodiment of the invention.

FIG. 7 illustrates a method 700 for retrieving an encoded percept from the long-term memory in response to an input stimulus, according to one embodiment of the invention. As shown, the method beings at step 705 where the activation function is used to identify one or more hard locations to activate. As described, in one embodiment, hard locations with a Hamming distance below a specified threshold, relative the input stimulus (an encoded percept), are activated. At step 710, the hard locations activated by the input stimulus are identified. At step 715, a final activation is determined, based on the locations activated by the input stimulus. For example, as described above, the final activation may be determined as an additive combination of each feature dimension value from each activated weight matrix entry. At step 720, a percept configuration is generated from the final activation. And at step 725, the percept configuration is returned to the workspace in response to the input stimulus.

Figure 8A:
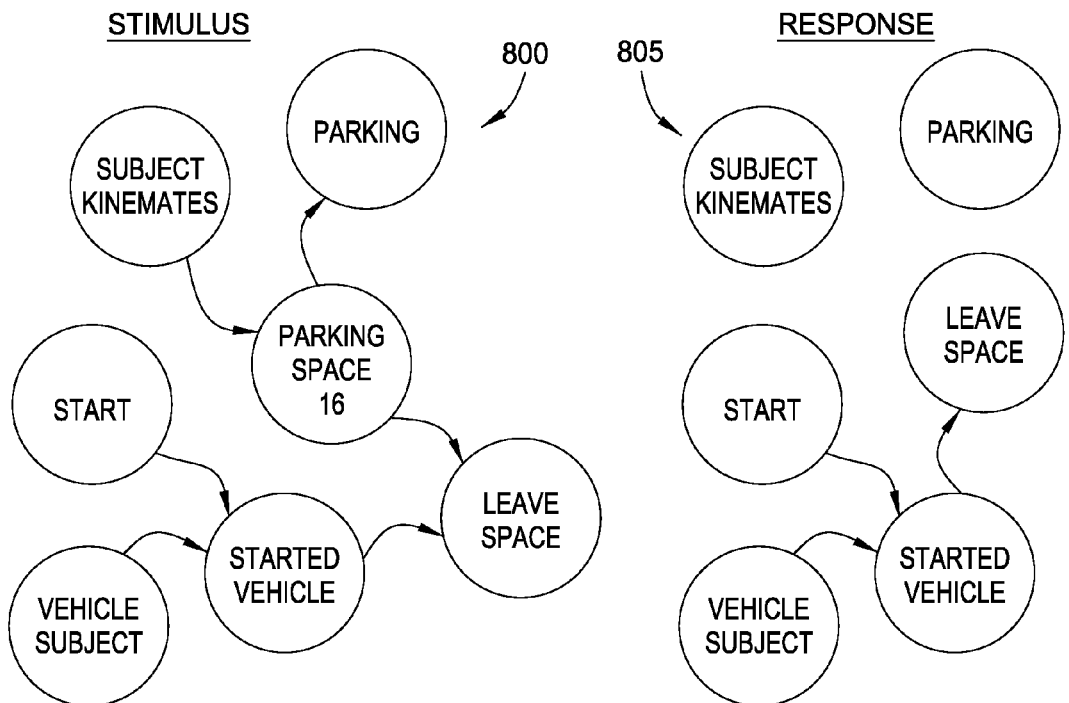
FIGS. 8A-8B illustrate examples of input percepts used to activate elements of a long-term memory as well as percepts returned in response, according to one embodiment of the invention.
Figure 8B:
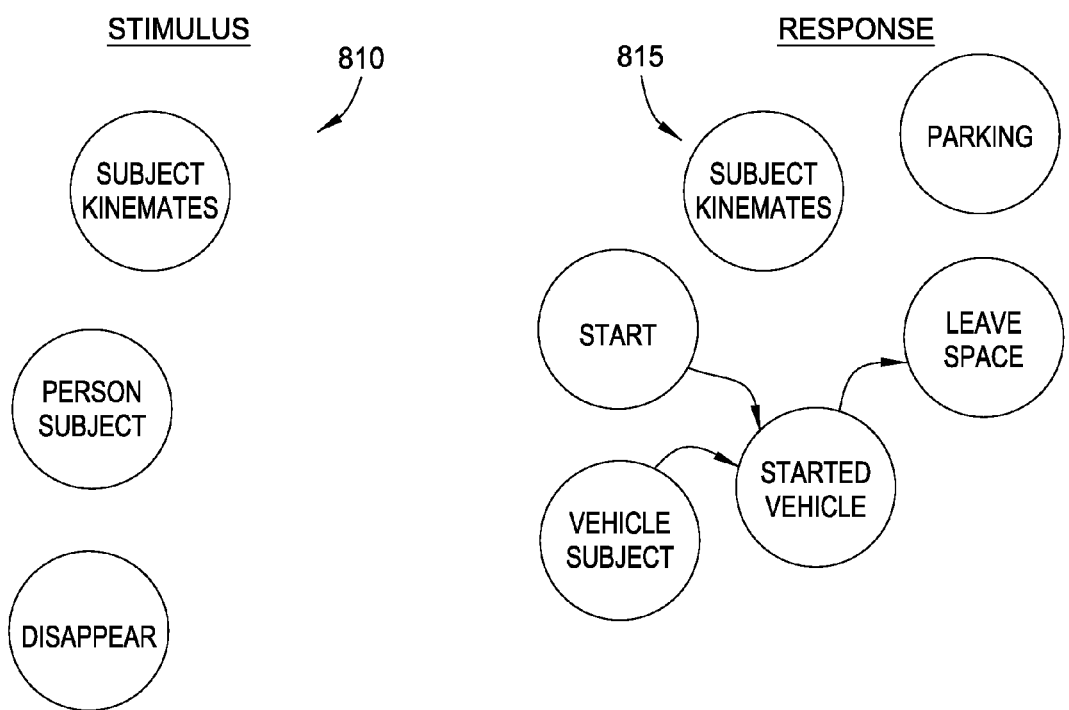

FIGS. 8A-8B illustrate examples of input percepts used to activate elements of a long-term memory as well as percepts returned in response, according to one embodiment of the invention. In the example of FIG. 8A, a stimulus 800 is used supplied to long-term memory, resulting in response 805 being returned (e.g., according to the method 700). Illustratively, stimulus 800 and response 805 are shown as percepts. Thus, the percept of stimulus 800 includes nodes representing a sub-graph of a neural network exited by an input from a computer vision engine. Illustratively, response 805 includes fewer nodes than stimulus 800. This may occur as the stimulus 800 is generated by events input from the computer vision engine and includes nodes representing the detail of a current event being observed by the computer vision engine 135 (e.g., a percept stored in episodic memory) where the response 800 does not include some of the specific detail of the input stimulus (e.g., the node representing "parking space 16"). This allows a codelet to evaluate the stimulus representing the current event to identify patterns of events from the numerical data output by the computer vision engine.

Similarly, FIG. 8B illustrates a stimulus 810 and response 815. Illustratively, the stimulus 810 generates a response 815 that includes more nodes than the input. This may occur when one stimulus activates multiple hard locations in the long-term memory. For example, the actions represented by the nodes of stimulus 810 include "subject kinematics" a "person subject" and an event of "disappear." Assume that these actions are highly correlated in the long-term memory with the actions of a person entering a car and leaving a parking lot. In such a case, the input stimulus may activate hard locations related to parking, resulting in weight values for hard locations associated with a person disappearing to be combined with weight values for hard locations associated with vehicle behavior, resulting in a final activation returned in response to the input stimulus 815.

Advantageously, as described herein, embodiments of the invention provide a long-term memory used to store and retrieve information learned while a video analysis system observes a stream of video frames. The long-term memory provides a memory with a capacity that grows in size gracefully, as events are observed over time. Additionally, the long-term memory may encode events, represented by sub-graphs of a neural network. Further, rather than predefining a number of patterns recognized and manipulated by the long-term memory, embodiments of the invention provide a long-term memory where the size of a feature dimension (used to determine the similarity between different observed events) may grow dynamically as necessary, depending on the actual events observed in a sequence of video frames.

While the foregoing is directed to embodiments of the present invention, other and further embodiments of the invention may be devised without departing from the basic scope thereof, and the scope thereof is determined by the claims that follow.

What is claimed is:

1. A computer-implemented method for storing an encoded percept in a long-term memory, comprising:
   initializing the long-term memory, wherein the long-term memory includes a set of hard-locations, a weight matrix, and an activation function;
   receiving a percept, wherein the percept comprises a sub-graph of a neural network excited by an input stimulus;
   encoding the percept as a bit pattern;
   generating a variable length entry in the set of hard locations;
   storing the encoded percept in the variable length entry; and
   generating an entry in the weight matrix corresponding to the encoded percept.

2. The method of claim 1, further comprising, compressing the bit pattern using an encoding/decoding scheme that enables varying length features.

3. The method of claim 1, wherein generating the entry in the weight matrix corresponding to the encoded percept comprises copying the bit pattern of the encoded percept to the entry in the weight matrix.

4. The method of claim 1, further comprising:
   receiving a second percept, wherein the second percept comprises a sub-graph of a neural network excited by an input stimulus;
   encoding the second percept as a second bit pattern;
   determining, using an adaptive resonance theory (ART) network, at least one hard location within a specified measure of similarity to the second bit pattern; and
   reinforcing the entry in the weight matrix corresponding to the at least one hard location.

5. The method of claim 4, wherein reinforcing the entry in the weight matrix corresponding to the at least one hard location comprises:
   converting each 0 value in the bit pattern to a −1; and
   adding each respective value in the converted bit pattern to a corresponding value in the weight matrix entry corresponding to the identified at least one hard location.

6. The method of claim 1, further comprising:
   receiving a request to return a percept from the long-term memory, wherein the request includes a second percept;
   encoding the second percept as a second bit pattern;
   evaluating the second bit pattern using a choice function and a vigilance function specified for an adaptive resonance theory (ART) network to identify one or more hard locations within a specified measure of similarity to the second bit pattern;
   retrieving a weight matrix entry corresponding to each identified hard location;
   adding the weight matrix entries to determine a final activation;
   converting the final activation to a third bit pattern;
   decoding the third bit pattern;
   generating from the decoded third bit pattern, a third percept; and
   returning, as a response to the request, the third percept.

7. The method of claim 6, wherein converting the final activation to the third bit pattern comprises converting each positive value in the final activation to a 1 and each negative value to a 0.

8. The method of claim 1, wherein the input stimulus comprises a primitive event symbol stream supplied by a computer vision engine configured to analyze a sequence of video frames.

9. A computer-readable storage medium containing a program which, when executed by a processor, performs an operation for storing an encoded percept in a long-term memory, the operation comprising:
   initializing the long-term memory, wherein the long-term memory includes a set of hard-locations, a weight matrix, and an activation function;
   receiving a percept, wherein the percept comprises a sub-graph of a neural network excited by an input stimulus;
   encoding the percept as a bit pattern;
   generating a variable length entry in the set of hard locations;
   storing the encoded percept in the variable length entry; and
   generating an entry in the weight matrix corresponding to the encoded percept.

10. The computer-readable storage medium of claim 9, wherein the operation further comprises, compressing the bit pattern using an encoding/decoding scheme that enables varying length features.

11. The computer-readable storage medium of claim 9, wherein generating the entry in the weight matrix corresponding to the encoded percept comprises copying the bit pattern of the encoded percept to the entry in the weight matrix.

12. The computer-readable storage medium of claim 9, wherein the operation further comprises:
 receiving a second percept, wherein the second percept comprises a sub-graph of a neural network excited by an input stimulus;
 encoding the second percept as a second bit pattern;
 determining, using an adaptive resonance theory (ART) network, at least one hard location within a specified measure of similarity to the second bit pattern; and
 reinforcing the entry in the weight matrix corresponding to the at least one hard location.

13. The computer-readable storage medium of claim 12, wherein reinforcing the entry in the weight matrix corresponding to the at least one hard location comprises:
 converting each 0 value in the bit pattern to a −1; and
 adding each respective value in the converted bit pattern to a corresponding value in the weight matrix entry corresponding to the identified at least one hard location.

14. The computer-readable storage medium of claim 9, wherein the operation further comprises:
 receiving a request to return a percept from the long-term memory, wherein the request includes a second percept;
 encoding the second percept as a second bit pattern;
 evaluating the second bit pattern using a choice function and a vigilance function specified for an adaptive resonance theory (ART) network to identify one or more hard locations within a specified measure of similarity to the second bit pattern;
 retrieving a weight matrix entry corresponding to each identified hard location;
 adding the weight matrix entries to determine a final activation;
 converting the final activation to a third bit pattern;
 decoding the third bit pattern;
 generating from the decoded third bit pattern, a third percept; and
 returning, as a response to the request, the third percept.

15. The computer-readable storage medium of claim 14, wherein converting the final activation to the third bit pattern comprises converting each positive value in the final activation to a 1 and each negative value to a 0.

16. The computer-readable storage medium of claim 9, wherein the input stimulus comprises a primitive event symbol stream supplied by a computer vision engine configured to analyze a sequence of video frames.

17. A system comprising,
 a video input source configured to provide a sequence of video frames, each depicting a scene;
 a processor; and
 a memory containing a machine learning application which when executed by the processor is configured to perform an operation for storing an encoded percept in a long-term memory, the operation comprising:
  initializing the long-term memory, wherein the long-term memory includes a set of hard-locations, a weight matrix, and an activation function,
  receiving a percept, wherein the percept comprises a sub-graph of a neural network excited by an input stimulus,
  encoding the percept as a bit pattern,
  generating a variable length entry in the set of hard locations,
  storing the encoded percept in the variable length entry, and
  generating an entry in the weight matrix corresponding to the encoded percept.

18. The system of claim 17, wherein the operation further comprises, compressing the bit pattern using an encoding/decoding scheme that enables varying length features.

19. The system of claim 17, wherein generating the entry in the weight matrix corresponding to the encoded percept comprises copying the bit pattern of the encoded percept to the entry in the weight matrix.

20. The system of claim 17, wherein the operation further comprises:
 receiving a second percept, wherein the second percept comprises a sub-graph of a neural network excited by an input stimulus;
 encoding the second percept as a second bit pattern;
 determining, using an adaptive resonance theory (ART) network, at least one hard location within a specified measure of similarity to the second bit pattern; and
 reinforcing the entry in the weight matrix corresponding to the at least one hard location.

21. The system of claim 20, wherein reinforcing the entry in the weight matrix corresponding to the at least one hard location comprises:
 converting each 0 value in the bit pattern to a −1; and
 adding each respective value in the converted bit pattern to a corresponding value in the weight matrix entry corresponding to the identified at least one hard location.

22. The system of claim 17, wherein the operation further comprises:
 receiving a request to return a percept from the long-term memory, wherein the request includes a second percept;
 encoding the second percept as a second bit pattern;
 evaluating the second bit pattern using a choice function and a vigilance function specified for an adaptive resonance theory (ART) network to identify one or more hard locations within a specified measure of similarity to the second bit pattern;
 retrieving a weight matrix entry corresponding to each identified hard location;
 adding the weight matrix entries to determine a final activation;
 converting the final activation to a third bit pattern;
 decoding the third bit pattern;
 generating from the decoded third bit pattern, a third percept; and
 returning, as a response to the request, the third percept.

23. The system of claim 22, wherein converting the final activation to the third bit pattern comprises converting each positive value in the final activation to a 1 and each negative value to a 0.

24. The system of claim 17, wherein the input stimulus comprises a primitive event symbol stream supplied by a computer vision engine configured to analyze a sequence of video frames.

* * * * *